Figures 1, 2, 3:
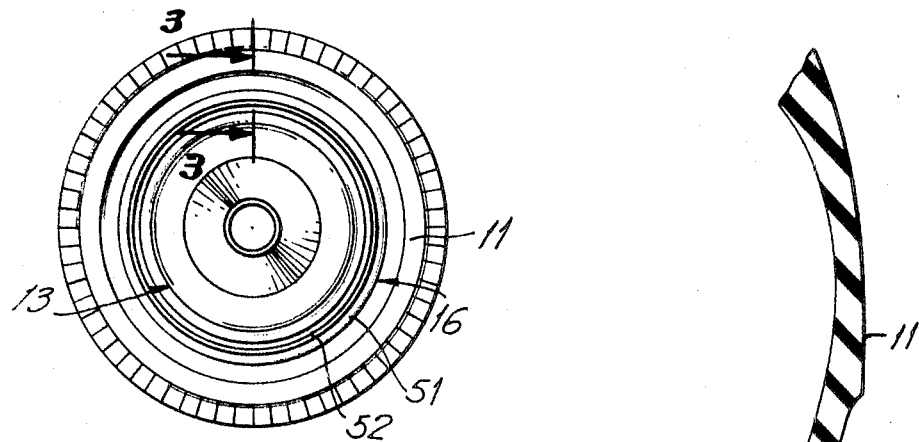

United States Patent

[11] 3,597,002

| [72] | Inventor | Herbert Buerger |
| | | Walton, N.Y. |
| [21] | Appl. No. | 819,853 |
| [22] | Filed | Apr. 28, 1969 |
| [45] | Patented | Aug. 3, 1971 |
| [73] | Assignee | Del Krome Corp. |
| | | Walton, N.Y. |

[54] TIRE WHEEL TRIM STRUCTURE
5 Claims, 3 Drawing Figs.

| [52] | U.S. Cl. | 301/37 |
| [51] | Int. Cl. | B60b 7/04, B60c 13/00 |
| [50] | Field of Search | 301/37 |

[56] References Cited
UNITED STATES PATENTS

| 2,909,390 | 10/1959 | Wood | 301/37 |
| 3,001,827 | 9/1961 | Lyon | 301/37 |
| 3,055,712 | 9/1962 | Shoemaker | 301/37 |
| 3,320,002 | 5/1967 | Buerger | 301/37 |

Primary Examiner—Richard Johnson
Attorney—J. B. Felshin

ABSTRACT: A spring ring is attached to a tire-carrying wheel cover or other annular wheel trim overlying the wheel, and is provided with spring fingers to grip the rim of the wheel. A white wall tire-simulating member is assembled with the ring and cover trim. This member has a portion overlying a portion of the tire, and also has a thickened annular inner edge or bead which fits into an annular channel provided by the ring and trim or cover. This thickened bead and the channel are so shaped that the bead is easily inserted into the channel and has a outwardly facing annular shoulder surface engaging an annular inwardly facing shoulder of the channel, whereby an outward radial pull on said member will cause the shoulder on the channel to hold said member in place against being pulled out. Said inner bead of said member is of triangular shape in radial cross section so that it enters the channel easily and without necessity for squeezing or forcing it into the channel.

PATENTED AUG 3 1971

3,597,002

INVENTOR
HERBERT BUERGER

BY J.B. Felshin
ATTORNEY

TIRE WHEEL TRIM STRUCTURE

BACKGROUND OF THE INVENTION

1. Field of the Invention

This invention relates to tire wheel trims or covers carrying white wall tire-simulating rings to overlap the tires.

2. Description of the Prior Art

Wheel trims carrying white wall simulating rings of rubber or the like material are known, as in applicants U.S. Pat. No. 3,320,002.

SUMMARY OF THE INVENTION

In a prior structure such as disclosed in my U.S. Pat. No. 3,320,002, a white wall simulating ring was provided with an inner edge bead that fitted into a channel. The bead in that patent, fitted tightly into the channel and was squeezed therein. Difficulty has been found with such construction because in hot weather, the bead would often swell and sometimes forced itself out of the channel. Furthermore it has been found to be difficult to squeeze the bead into the channel. It is hence an object of this invention to obviate these difficulties by providing a highly improved construction comprising a white wall simulating ring having an inner edge bead projecting axially outwardly and a wheel trim and attaching ring having an axially inwardly opening channel to receive the bead, the construction being such however, that the bead can enter the channel easily and without necessity for squeezing, and in which the bead has an annular radially outwardly facing shoulder engaging a radially inwardly facing shoulder on the channel to hold the bead against being pulled off the channel.

Another object of this invention is to provide in a device of the character described, improved means for attaching the spring grip ring to the wheel trim or cover.

Still another object of this invention is to provide a strong rugged and durable construction of the character described which shall be relatively inexpensive to manufacture, easy to assemble, attractive in appearance, and yet practical and efficient to a high degree in use.

Other objects of this invention will in part be obvious and in part hereinafter pointed out. The invention accordingly consists in the features of construction, combinations of elements, and arrangement of parts which will be exemplified in the construction hereinafter described, and of which the scope of invention will be indicated in the following claims. BRIEF DESCRIPTION OF THE DRAWING FIG. 1 is an outer view of a tire wheel provided with a wheel trim or cover and white wall simulating member embodying the invention;

FIG. 2 is a partial perspective view partly in cross section, of the wheel cover and attaching ring and white wall tire simulating member before attachment to a wheel; and FIG. 3 is an enlarged cross-sectional view taken on line 3–3 of FIG. 1. DESCRIPTION OF THE PREFERRED EMBODIMENTS Referring now in detail to the drawing, 10 designates a wheel of a vehicle, carrying a tire 11 and provided with an assembly 12 embodying the invention and comprising generally of a wheel cover 13 or wheel trim, a grip ring 14 attached thereto and gripping the rim 15 of the wheel 10 and an annular white wall tire-simulating ring 16 of rubber, plastic or other nonmetallic, flexible or compressible material.

The tire 11 may be of usual construction, as is the wheel 10. The rim 15 is of usual construction and is mounted on a usual hub or spoke member 17.

The wheel cover or trim or other wheel overlying, decorative member 13 is circular and may be of any usual shape at its central portion 20. Near its periphery, said member 13 has an annular flat portion 23 extending radially outwardly from said central portion 20.

Extending axially inwardly from the outer end of portion 23 is a radially outwardly curved portion 25 which extends axially inwardly. At the axially inward end of portion 25 is a portion 26 which extends radially inwardly, but with a smaller radius of curvature than that of portion 25, and terminating in an edge 27.

Attached to wheel cover or trim 13 is the grip ring 14. Said grip ring 14 is preferably made of spring steel. It comprises an annular radially extending flat portion 30 lying flat against the inner surface of wall 23. Extending axially inwardly from the radial outer end of wall 30 is a lip 31 which is curved outwardly and lies against the inner surface of wall 25. The inner edge 32 of lip 31 engages an inner surface of wall 26. Thus, the wall 26 curves around edge 32 and forms a channel into which said edge projects, to prevent relative axial or radial movement between members 13 and 14.

Extending axially inwardly from the radially inner end of wall 30, is an annular wall 35 which may be corrugated as shown in the drawing. At the axial inner end of wall 35 are inner and outer spring fingers 37, 38 such as are disclosed in my copending application Ser. No. 750,974, filed Aug. 7, 1968 for Wheel Rim Mounted Devices.

The white wall tires simulating ring 16 as an inner bead 40 having a cylindrical inner surface 41 resting on the outer side of the corrugated portion of wall 35, between wall 30 and the fingers 37, 38. Said bead has an axially outer end 43 projecting into the channel formed by walls 35, 30 and 31 of member 14. Said portion 43 has a radially outwardly and axially inwardly inclined surface 44 at about 45° to the axis of member 14.

Bead 40 also has an axially inwardly extending annular end 46 disposed between wall 35 of member 14 and an inner shoulder 15a of rim 15. The spring fingers 37, 38 have edges engaging said shoulder 15a in the same manner as is disclosed in my said copending application Ser. No. 750,974, filed Aug. 7, 1968, to attach the assembly of members 13, 14, 16 to the tire rim 15.

Extending radially outwardly of said bead 40 is a web portion 50 which passes between wall 32 of member 13 and the rim 15. Extending from web 50 is an outwardly curved portion 51 overlapping the tire 11 and formed with an intermediate annular outwardly extending bead 52.

Wall 51 is normally curved as shown in FIG. 2 when the assembly 13, 14, 16 is not attached to the wheel. However when the assembly is attached to the wheel, the wall 51 is flexed outwardly to the position of FIG. 3. As shown in said figure, the wall 51 is inclined radially and axially outwardly at about 45° to the axis of the wheel, and hence it extends almost at right angles to surface 44 of the bead 40. An outward pull on the wall 51 will cause surface 44 to contact rolled portion 32 of member 13 to keep member 16 from pulling out of the spring grip ring 14.

It will be observed that bead portion 43 easily enters the channel and does not have to be forced thereinto. In case of expansion, the channel provides ample free space for such expansion, so that the bead will not have a tendency to squeeze itself out of the channel, as sometimes happens when the bead fills the channel in constructions such as shown in my U.S. Pat. No. 3,320,002.

Since the bead portion 43 decreases in thickness axially outwardly it enters the channel easily and it does not fill the channel. There is space in the channel between surface 44 and walls 30 and 31, allowing for expansion in the event that the bead expands by reason of heat.

It will thus be seen that there is provided an article in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, is to be interpreted as illustrative only.

I claim:

1. In combination, an annular wheel-overlying member, a spring ring having means to grip the rim of a wheel, cooperating means on said member and ring for attaching said member and ring together, said member and ring having means forming an axially inwardly opening channel, a white wall tire simulating member having a bead at its inner end, said bead having an axially outwardly extending bead portion received in said channel, said bead portion being gradually reduced in thickness axially outwardly, said channel forming means comprising an annular flat radial wall on said overlying member, an axially inwardly extending wall at the outer end of said annular flat wall, a radially inwardly extending curved wall at the end of said axially inwardly extending wall, said spring ring having an axially inwardly extending wall, a radially outwardly extending wall extending from the axially outer end of said axially inwardly extending from the axially outer end of said axially inwardly extending wall of said spring ring, contacting the axially inner surface of said flat radial wall of said overlying member, a wall extending axially inwardly from the radially outer end of said radially outwardly extending wall of said spring ring, and having an axially inner edge received within the curvature of said radially inwardly extending curved wall of said overlying member.

2. The combination of claim 1, said axially inwardly extending wall of said overlying member being outwardly curved on a radius of curvature greater than that of said radially inwardly extending wall of said overlying member.

3. The combination of claim 1, and spring fingers at the axially inner end of said axially inwardly extending wall of said spring ring, to engage the rim of a wheel.

4. In combination, an annular wheel overlying member, a spring ring having means to grip the rim of a wheel, cooperating means on said member and ring for attaching said member and ring together, said member and ring having means forming an axially inwardly opening channel, a white wall tire simulating member having a bead at its inner end, said bead having an axially outwardly extending bead portion received in said channel, said bead portion being gradually reduced in thickness axially outwardly said simulating member having a portion adjacent said bead, engaging the radially outer portion of said channel-forming means, and a wall extending radially and axially outwardly from said adjacent portion said bead having an outer, radially inwardly and axially outwardly inclined annular surface said surface being substantially at right angle to said wall of said simulating member said channel forming means comprising an annular flat radial wall on said overlying member, an axially inwardly extending wall at the outer end of said annular flat wall, a radially inwardly extending curved wall at the end of said axially inwardly extending wall, said spring ring having an axially inwardly extending wall, a radially outwardly extending wall extending from the axially outer end of said axially inwardly extending wall of said spring ring, contacting the axially inner surface of said flat radial wall of said overlying member, a wall extending axially inwardly from the radially outer end of said radially outwardly extending wall of said spring ring, and having an axially inner edge received within the curvature of said radially inwardly extending curved wall of said overlying member.

5. The combination of claim 4, said bead having a radially inwardly extending portion disposed between said axially inwardly extending wall of said spring ring and the rim of the wheel.